THOMAS DARK.
Improvement in Receivers and Stench-Traps for Street-Sewers.
No. 114,270. Patented May 2, 1871.
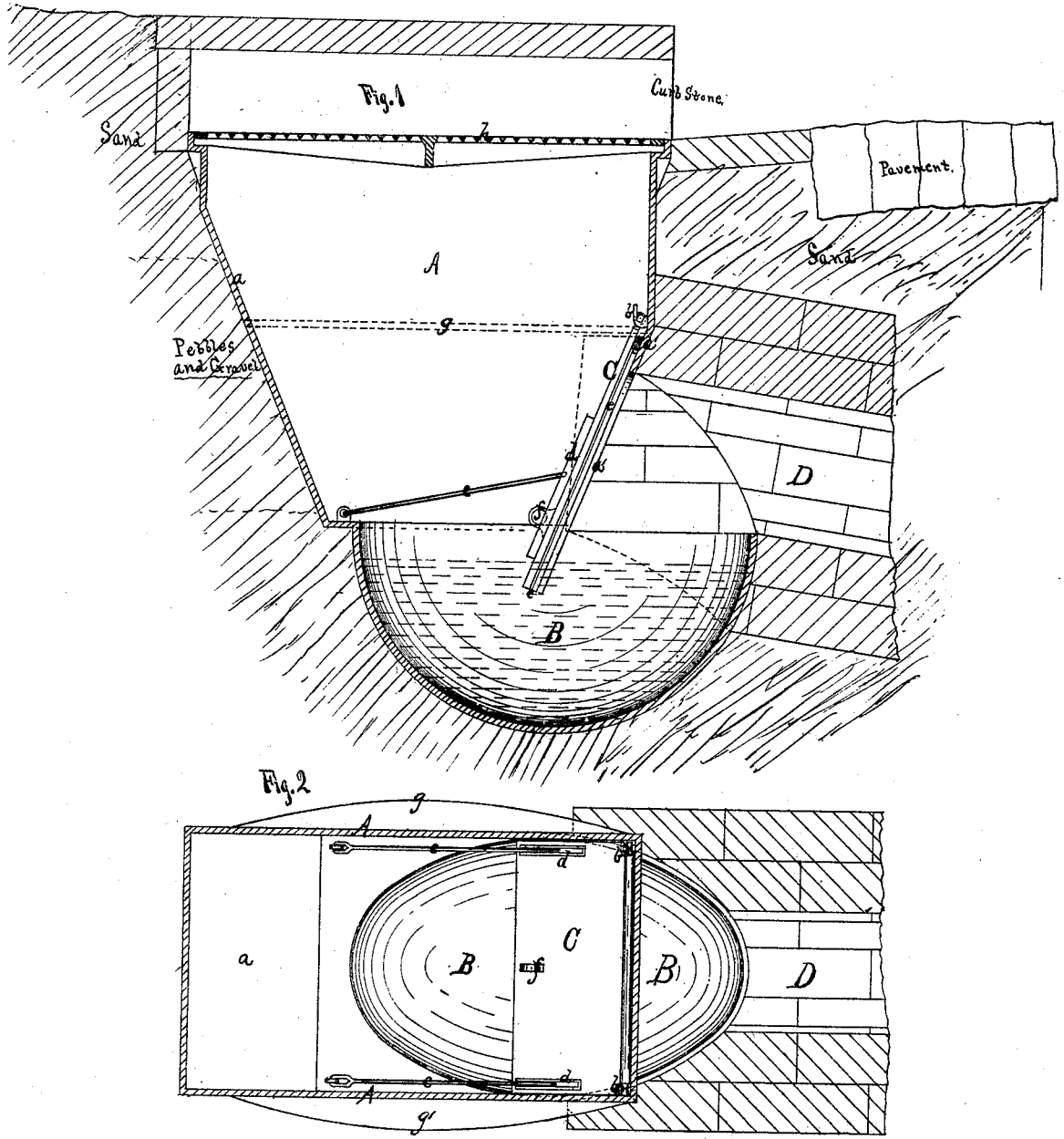

United States Patent Office.

THOMAS DARK, OF BUFFALO, NEW YORK.

Letters Patent No. 114,270, dated May 2, 1871.

IMPROVEMENT IN RECEIVERS AND STENCH-TRAPS FOR STREET-SEWERS.

The Schedule referred to in these Letters Patent and making part of the same.

I, THOMAS DARK, of Buffalo, in the county of Erie and State of New York, have invented certain new and useful Improvements in Receivers and Stench-Traps for Street-Sewers, &c., of which the following is a specification.

Nature of the Invention.

This invention relates to the receivers of sewers, usually placed at the corners of streets, which have a stench-trap combined therewith; and My invention consists of a peculiarly-constructed iron receiver and trap made in one piece.

It also consists in the combination, with the receiver and with the outlet-pipe, of a valve which serves the double purpose of forming a stench-trap, and of permitting the ready cleaning of the sewer, as hereinafter described.

General Description.

In the drawing—

Figure 1 is a sectional elevation.

Figure 2, a sectional plan.

A represents the receiver, and

B the stench-trap, all formed of iron, in one piece.

The back, $a$, of the receiver is made slanting to increase the rush or momentum of the water into the trap; and the front end, $a'$, which opens into the brick conduit D, is also made slanting inward for a similar purpose.

A valve-trap or gate, C, is hung or hinged at $b$, which closes the opening into the conduit, but is so hung that it can be raised at any time to clean out the conduit or sewer.

This valve projects down a short distance into the trap B, the water which always stands in the trap and the valve forming an effective barrier to the effluvia.

The valve is held in place, as against any backward flow of water or other pressure, by means of rods $c\ c'$, attached, by eyes or cleats, to the back or bottom of the receiver, and their ends resting in grooves $d\ d'$, formed on the face of the valve, one at each side.

To further insure that no stench shall escape through the sides of the valve I form on the inside of the slanting back of the receiver hollow frames or grooves $e\ e'$, which are packed with asphaltum or its equivalent; and the edges of the stench-valve rest or lie against this, and are held tightly by the rods above mentioned, which press it against the packing. This forms a most effectual stench-trap.

An eye, $f$, is attached to the lower end of the valve, by which it can be raised by a hook inserted from above when access to the brick conduit D or sewer is desired.

The trap B is of a half-oval form, open at the top, one-half opening into the receiver forward of the stench-valve, and the other half opening outside of the receiver into the conduit-pipe D.

On the outside of the receiver, about half-way down, is formed a flange, $g\ g'$, which I call a frost-flange, put there to nullify the action of frost, and to strengthen the receiver itself.

Below this flange, and up to the sand, the receiver is packed around with small stones or pebbles, so that any movement of the ground caused by frost will merely move these pebbles against the flanges and lower side of the receiver without having any other effect.

On top of the receiver is an iron grating, $h$, to keep as much as possible foreign matter from getting in with the water.

Other street-receivers that I am acquanted with are usually made of stone and brick, and with a stench-trap formed of a section of curved pipe, sometimes with an open trap and a vertical stone setting in the water in the trap. These are not tight, and are constantly getting out of order, the trap and receiver being clogged by straw, sticks, pieces of leather, paper, tin boxes, &c., wedged together and held by the accumulated mud.

To clean out these sewers the pavement has to be removed, the street dug up, and the pipe and trap broken open; then repaired at considerable expense, and they work after a fashion a short time, when they get clogged again, when the same process has to be repeated.

Besides this, oftentimes they are made or repaired by unpractical persons, and not made tight, and the consequence is a constant escape of gas and effluvia.

The special features of my invention are, that the receiver and trap being made in one piece, perfect tightness is insured; also, its construction with the inwardly-slanting ends adds so much to the force of the water as it runs into the trap down the steep sides as to "flush out" the trap.

The greatest advantage is derived from the ease with which the conduit and sewer can be cleaned out by simply raising the valve-trap C, (which can be done from above,) and inserting a series of rods with screw-joints into the pipe and sewers.

Thus the accumulated rubbish which clogs the sewer can be speedily and effectually removed without the least damage to the sewer, and doing away with the necessity of breaking up the street and into the pipes, &c.

The top of these receivers (or the grating $h$) sits flush with the pavement, presenting no obstruction to wheels, &c.

What I claim is—

The construction and arrangement of the iron receiver A with slanting ends $a\ a'$, and outside frost-flanges $g\ g'$, and trap B, all formed in one piece, and having the hinged valve-trap C resting on packed seats or grooves $e\ e'$, and held in place by rods $c\ c'$, as hereinbefore set forth.

In witness whereof I have hereunto signed my name in the presence of two subscribing witnesses.

THOMAS DARK.

Witnesses:
ALBERT HAIGHT,
C. N. WOODWARD.